(12) United States Patent
Khachatryan et al.

(10) Patent No.: US 9,844,924 B2
(45) Date of Patent: Dec. 19, 2017

(54) GLASS LAMINATE, DISPLAY ELEMENT, DISPLAY APPARATUS, METHOD OF MANUFACTURING THE GLASS LAMINATE, AND METHOD OF MANUFACTURING THE DISPLAY PANEL

(71) Applicant: Samsung Display Co., Ltd., Yongin (KR)

(72) Inventors: Hayk Khachatryan, Yongin (KR); Chang-Mo Park, Yongin (KR); Dong-Min Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 1056 days.

(21) Appl. No.: 14/055,439

(22) Filed: Oct. 16, 2013

(65) Prior Publication Data

US 2014/0356559 A1 Dec. 4, 2014

(30) Foreign Application Priority Data

May 28, 2013 (KR) .................. 10-2013-0060611

(51) Int. Cl.
*B32B 17/06* (2006.01)
*B32B 37/24* (2006.01)

(52) U.S. Cl.
CPC ........ *B32B 17/06* (2013.01); *B32B 2037/246* (2013.01); *Y10T 156/10* (2015.01); *Y10T 428/131* (2015.01)

(58) Field of Classification Search
CPC . B32B 17/06; B32B 2037/246; Y10T 156/10; Y10T 428/131
See application file for complete search history.

(56) References Cited

U.S. PATENT DOCUMENTS

| | | | |
|---|---|---|---|
| 6,808,797 B1 | 10/2004 | Bordeaux | |
| 2005/0052600 A1* | 3/2005 | Hashimoto | G02F 1/133734 349/130 |
| 2005/0136625 A1 | 6/2005 | Henseler et al. | |
| 2008/0261057 A1* | 10/2008 | Slobodin | G02F 1/133308 428/447 |
| 2011/0111194 A1 | 5/2011 | Carre et al. | |

(Continued)

FOREIGN PATENT DOCUMENTS

| | | |
|---|---|---|
| TW | 200916426 | 4/2009 |
| TW | 201314644 | 4/2013 |

OTHER PUBLICATIONS

Mack et al., "Gas development at the interface of directly bonded silicon wafers: investigation on silicon-based pressure sensors," Sensors and Actuators A: Physical, vol. 56, 1996, pp. 273-277, Elsevier Science S.A.

(Continued)

*Primary Examiner* — Jacob T Minskey
*Assistant Examiner* — Vishal I Patel
(74) *Attorney, Agent, or Firm* — H.C. Park & Associates, PLC (57) ABSTRACT

A glass laminate, a display element, a display apparatus, a method of manufacturing the glass laminate, and a method of manufacturing the display panel. The glass laminate includes a carrier glass substrate; an intermediate layer stacked on the carrier glass substrate and formed of a material having a columnar grain structure; and a thin glass substrate stacked on the intermediate layer.

10 Claims, 4 Drawing Sheets

(56) References Cited

U.S. PATENT DOCUMENTS

2011/0192525 A1\* 8/2011 Kondo ..................... B30B 5/02
 156/99
2012/0009703 A1\* 1/2012 Feinstein .............. G02F 1/1333
 438/28
2012/0202030 A1 8/2012 Kondo et al.
2013/0072079 A1 3/2013 Tang et al.

OTHER PUBLICATIONS

Smedskjaer et al., "Modifying glass surfaces via internal diffusion," Journal of Non-Crystalline Solids, vol. 356, Jan. 2010, pp. 290-298, Elsevier B.V.
Crawford et al., "Flexible Flat Panel Displays," 2005, p. 1-55, John Wiley & Sons, Ltd.
Zhabrev et al., "Ion Diffusion in Oxide Glasses and Melts: I. Bibliography," Glass Physics and Chemistry, vol. 29, No. 2, 2003, pp. 140-159.

\* cited by examiner

GLASS LAMINATE, DISPLAY ELEMENT, DISPLAY APPARATUS, METHOD OF MANUFACTURING THE GLASS LAMINATE, AND METHOD OF MANUFACTURING THE DISPLAY PANEL

CROSS-REFERENCE TO RELATED PATENT APPLICATION

This application claims the benefit of Korean Patent Application No. 10-2013-0060611, filed on May 28, 2013, which is hereby incorporated by reference for all purposes as if fully set forth herein.

BACKGROUND

Field

Exemplary embodiments of the present invention relate to a glass laminate, a display element, a display device, a method of manufacturing a glass laminate, and a method of manufacturing a display panel.

Discussion of the Background

Interest in glass as a structural and functional material has recently increased. In particular, because a thin glass substrate is transparent, flexible, and has a low thermal expansion coefficient and a high thermal resistance, use thereof in a flexible display device has been proposed. However, due to its flexibility, it is difficult to independently use a thin glass substrate during the manufacture of a flexible display device. Instead, a thin glass substrate has typically been attached to a rigid carrier glass substrate to form a flexible display device.

However, when a thin glass substrate is stacked on a carrier glass substrate, bubbles may be generated between the two glass substrates. In addition, when the stacked glass substrate is exposed to a high temperature during the processes for manufacturing a flexible display device, the two glass substrates may be permanently bonded to each other, and separating the two bonded glass substrates is then impossible. Also, when the thin glass substrate and the carrier glass substrate have different thermal expansion coefficients, concentrated stress is generated in some areas of the thin glass substrate, which leads to the occurrence of cracks in the thin glass substrate due to temperature variations.

SUMMARY

Exemplary embodiments of the present invention provide a glass laminate formed by adhering a thin glass substrate on a carrier glass substrate, which may be later isolated from each other without generating defects.

Exemplary embodiments of the present invention also provide a display element and a display apparatus, both including the glass laminate.

Exemplary embodiments of the present invention also provide a method of manufacturing the glass laminate and a method of manufacturing the display panel.

Additional features of the invention will be set forth in the description which follows, and in part will be apparent from the description, or may be learned by practice of the invention.

An exemplary embodiment of the present invention discloses a glass laminate including: a carrier glass substrate; an intermediate layer stacked on the carrier glass substrate and formed of a material having a columnar grain structure; and a thin glass substrate stacked on the intermediate layer.

An exemplary embodiment of the present invention also discloses a method of manufacturing a glass laminate, the method including: forming an intermediate layer of a material having a columnar grain structure on a carrier glass substrate; and stacking a thin glass substrate on the intermediate layer.

According to another aspect of the present invention, there is provided a method of manufacturing a display panel, the method including: manufacturing a glass laminate; forming a display device layer on a thin glass substrate of the glass laminate; and forming an encapsulation layer on the display device layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

In the drawings, like components are denoted by like reference numerals. In the drawings, the lengths and sizes of layers and regions may be exaggerated for clarity.

The terminology used in the present specification is used only to describe specific embodiments and does not have any intention to limit the present invention. An expression in the singular includes an expression in the plural unless they are clearly different from each other in a context. In the specification, it should be understood that terms such as 'include' and 'have' are used to indicate the existence of implemented features without excluding in advance the possibility of existence or addition of one or more other features. In the specification, the term "and/or" includes any and all combinations of one or more of the associated listed features. In the specification, terms, such as 'first' and 'second', are merely used for an intention for classifying a certain feature from another feature to describe various features, and the features are not limited by the terms. In the description below, when it is disclosed that a first feature is connected to, combined with, or linked to a second feature, this does not exclude that a third feature may be interposed between the first feature and the second feature. However, when it is disclosed that the first element is disposed directly on the second element, this excludes a case where the third element is disposed between the first element and the second element.

All terms used herein including technical or scientific terms have the same meaning as those generally understood by one of ordinary skill in the art unless they are defined differently. It should be understood that terms generally used, which are defined in a dictionary, have the same meaning as in a context of related technology, and the terms are not understood as ideal or excessively formal meaning unless they are clearly defined in the application.

As used herein, the term "and/or" includes any and all combinations of one or more of the associated listed items. Expressions such as "at least one of," when preceding a list of elements, modify the entire list of elements and do not modify the individual elements of the list.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
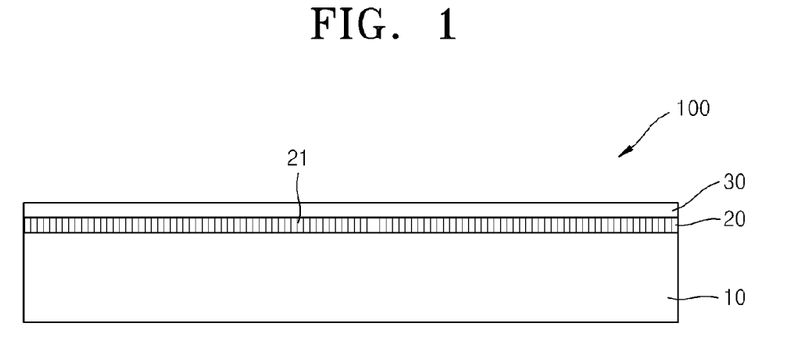
FIG. 1 is a schematic cross-sectional view showing a glass laminate according to an exemplary embodiment of the present invention.

FIG. 1 is a schematic cross-sectional view of a glass laminate 100 according to an exemplary embodiment of the present invention.

Referring to FIG. 1, a glass laminate 100 includes a carrier glass substrate 10, a thin glass substrate 30, and an intermediate layer 20 disposed between the carrier glass substrate 10 and the thin glass substrate 30.

The carrier glass substrate 10 may be a rigid substrate for supporting the thin glass substrate 30. The thin glass substrate 30 is flexible and, accordingly, may be difficult to use independently in manufacturing processes. In order to form a semiconductor device or a display device on the thin glass substrate 30, the thin glass substrate 30 is attached to the carrier glass substrate 10. In addition, after finishing the manufacturing processes, the thin glass substrate 30 is isolated from the carrier glass substrate 10.

The carrier glass substrate 10 has a thickness appropriate for a manufacturing line. The thickness of the carrier glass substrate 10 may be greater than that of the thin glass substrate 30 in order to support and reinforce the rigidity of the thin glass substrate 30.

A thermal expansion coefficient of the carrier glass substrate 10 may be substantially equal to that of the thin glass substrate 30. In this case, the glass laminate 100 may not bend when undergoing a thermal treatment. However, the thermal expansion coefficient of the carrier glass substrate 10 may differ from that of the thin glass substrate 30.

A material of the carrier glass substrate 10 may be the same as that of the thin glass substrate 30. In this case, the carrier glass substrate 10 and the thin glass substrate 30 may have substantially the same thermal expansion coefficients. However, the material of the carrier glass substrate 10 may differ from the material forming the thin glass substrate 30. For example, the carrier glass substrate 10 may be formed of an alkaline glass, for example, a soda-lime glass containing an alkaline metal oxide, or may be formed of an alkali-free glass. The shape and size of the carrier glass substrate 10 is not particularly limited.

The thin glass substrate 30 is a base substrate for forming a semiconductor device or a display device, such as a flexible display device. The thin glass substrate 30 is transparent and may have thermal resistance and flexibility, and may have a small thermal expansion coefficient.

The thin glass substrate 30 may have a thickness of about 100-500 nm. In addition, if the thin glass substrate 30 contains silicon nitride, the thin glass substrate 30 may have a thickness of about 300 nm. The thin glass substrate 30 may have a thickness of about 10 nm or less. The thin glass substrate 30 may be thin enough to provide a degree of flexibility. For example, the thin glass substrate 30 may be flexible enough to be curved or wound.

The thin glass substrate 30 may be used in manufacturing processes including a thermal process, after being attached to the carrier glass substrate 10. The thin glass substrate 30 may be isolated from the carrier glass substrate 10 after finishing the manufacturing processes.

The thermal expansion coefficient of the thin glass substrate 30 is not limited particularly. However, in order to ensure the durability and reliability of an apparatus including the thin glass substrate 30, the thermal expansion coefficient of the thin glass substrate 30 may be low. For example, the thin glass substrate 30 may be deformed by about 0.1% or less at a temperature variation of 100° C.

The material for forming the thin glass substrate 30 is not limited. For example, the thin glass substrate 10 may be formed of alkali glass or alkali free glass.

Methods of fabricating the carrier glass substrate 10 and the thin glass substrate 30 are not particularly limited. For example, melted glass may be formed as a plate by using a floating method, a fusion method, a cast method, a slot down draw method, and a redraw method to fabricate the carrier glass substrate 10 and the thin glass substrate 30.

Surfaces of the carrier glass substrate 10 and the thin glass substrate 30 may be polished. Also, the surfaces of the carrier glass substrate 10 and the thin glass substrate 30 may be cleaned manually with deionized water or by using an automatic cleaning apparatus.

The intermediate layer 20 may include a material 21 having a columnar grain structure. The intermediate layer 20 may be fixed on the carrier glass substrate 10, and may be attachable/detachable to/from the thin glass substrate 30. That is, the intermediate layer 20 may be attached to the thin glass substrate 30 with an attaching force small enough so that the thin glass substrate 30 may be isolated from the intermediate layer 20 without being damaged. Thus, when the thin glass substrate 30 is isolated, no remnant may remain on the thin glass substrate 30.

The intermediate layer 20 may either be in a softened state or a hardened state. If the intermediate layer 20 is in the softened state, the thin glass substrate 30 may be attached to the intermediate layer 20 with a strong attaching force. If the intermediate layer 20 is in the hardened state, the thin glass substrate 30 may be attached to the intermediate layer 20 with a weak attaching force, and may be easily isolated. The thickness of the intermediate layer 20 may be tens of micrometers or less, but is not so limited.

When the material 21 is solidified from a liquid phase to a solid phase, the material 21 may grow in a certain direction. For example, the material 21 may have a crystalline structure having a crystal growth direction that is perpendicular to the carrier glass substrate 10.

The material 21 may include at least one material selected from boron oxide, silicon nitride (in particular, beta-silicon nitride ($\beta$-$Si_3N_4$), silicon carbonate, and boron nitride. For example, the material 21 may be amorphous boron oxide. The material 21 including the boron oxide may be formed of a boric acid solution.

The material 21 may be deposited on the carrier glass substrate 10 by a physical vapor deposition method, such as a sputtering method. According to another exemplary embodiment, the material 21 may be deposited on the carrier glass substrate 10 by a chemical vapor deposition method.

The material 21 may be formed from a liquid phase material. In this case, a liquid phase material may be applied onto the carrier glass substrate 10 via, for example, a spin coating method, followed by a solidification process to form the material 21 in a solid phase having the columnar grain structure. During the solidification process, the material 21 may be grown while forming a crystalline structure in a direction perpendicular to the carrier glass substrate 10. Accordingly, the intermediate layer 20, including the material 21 having the columnar grain structure, may be formed on the carrier glass substrate 10.

The intermediate layer 20 may be softened. For example, when the carrier glass substrate 10 is exposed to high temperature, the material 21 contained in the intermediate layer 20 may be softened or melted. When the material 21 is softened, the material 21 may become viscous, and the thin glass substrate 30 may be attached to the intermediate layer 20 as a result of the viscosity of the material 21. The intermediate layer 20 may be hardened by a cooling operation to easily isolate the thin glass substrate 30 from the intermediate layer 20.

As described above, the material 21 may include amorphous boron trioxide. When the boron trioxide ($B_2O_3$) is grown from a liquid phase, the boron trioxide may have a columnar structure. In addition, when high temperature heat is applied to the boron trioxide, the boron trioxide may be softened before melting completely.

A boron trioxide layer may be formed on the carrier glass substrate 10 from a boric acid ($H_3BO_3$). A boric acid solution may be formed by dissolving the boric acid in water at room temperature to a specific solubility. For example, the solubility may be about 4.72 g/100 ml. The boric acid solution may be a boric acid saturated solution in which water is saturated with the boric acid.

The boric acid solution may be coated on the carrier glass substrate 10. For example, the boric acid solution may be applied on the carrier glass substrate 10 by a spin coating process. The carrier glass substrate 10 coated with the boric acid solution may be heated at a high temperature of, for example, about 460° C. or less.

When the carrier glass substrate 10 is heated, the boric acid ($H_3BO_3$) may be separated into metaboric acid ($HBO_2$) and water ($H_2O$) at a temperature of about 170° C. or less, as shown by the following chemical formula:

$$H_3BO_3 \rightarrow HBO_2 + H_2O \tag{1}$$

In addition, the metaboric acid ($HBO_2$) may be separated into boron trioxide ($B_2O_3$) and water ($H_2O$) at a temperature of about 300° C. or higher, as shown by the following chemical formula:

$$2HBO_2 \rightarrow B_2O_3 + H_2O \tag{2}$$

The boron trioxide ($B_2O_3$) may be melted at a temperature of about 450° C. or less. After that, in the cooling process, the boron oxide layer having the columnar grain structure may be formed on the carrier glass substrate 10.

By forming the intermediate layer 20 between the carrier glass substrate 10 and the thin glass substrate 30, permanent bonding of the carrier glass substrate 10 and the thin glass substrate 30 at, for example, a temperature of about 300° C. or higher, may be prevented. Moreover, when the carrier glass substrate 10 and the thin glass substrate 30 are bonded to each other by using a layer formed of an inorganic material or an organic material having a different crystal structure, cracks may be generated therein due to a difference between the thermal expansion coefficients of the carrier glass substrate 10 and the thin glass substrate 30. However, by forming the intermediate layer 20 to include the material 21 having the columnar structure between the carrier glass substrate 10 and the thin glass substrate 30, stress may be reduced even when the thermal expansion coefficients of the carrier glass substrate 10 and the thin glass substrate 30 are different from each other. Thus, the generation of cracks may be prevented in the thin glass substrate 30.

When the thin glass substrate 30 is stacked on the carrier glass substrate 10, bubbles may be generated between the thin glass substrate 30 and the carrier glass substrate 10. The amount and size of the bubbles may vary with a stacked state and surface states of the thin glass substrate 30 and the carrier glass substrate 10. According to an exemplary embodiment of the present invention, because the intermediate layer 20 including the material 21 having the columnar structure is disposed between the carrier glass substrate 10 and the thin glass substrate 30, no bubbles are generated.

Generally, glass surfaces contain hydroxide (—OH) groups. If two stacked glasses are annealed at a high temperature, for example, about 300° C. or higher, —OH groups on the surfaces of the two stacked glasses may react with each other. Consequently, —OH groups are chemically strongly bonded to each other, and the two stacked glasses may be permanently bonded to each other.

Moreover, components of the glass may be oxidized or reduced according to environmental conditions. When high temperature heat is applied to the two stacked glasses, glass modifiers and structural active elements are diffused therebetween. That is, metal cations (for example, $Mg^{2+}$, $Ca^{2+}$, and $Fe^{2+}$) included in the glass may be diffused toward the surfaces of the glass due to the high temperature annealing. Such diffusion of the metal cations directly affects the property of the glass. In particular, movement of the metal cations may cause a diffusion reaction.

The diffusion reaction may cause formation and growth of new phases by the chemical reactions occurring at boundaries between phases. Thus, the two stacked glasses may be permanently bonded to each other.

According to an exemplary embodiment of the present invention, since the intermediate layer 20 is disposed between the carrier glass substrate 10 and the glass substrate 30, —OH groups of the carrier glass substrate 10 and —OH groups of the thin glass substrate 30 are separated from each other and are prevented from reacting with each other, even when high temperatures are applied thereto. In addition, the diffusion reaction between the carrier glass substrate 10 and the glass substrate 30 may be reduced or prevented by the intermediate layer 20.

Figure 2:
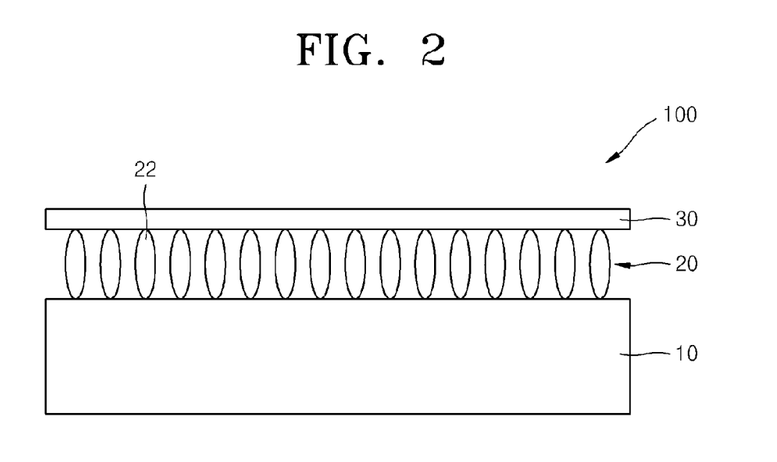
FIG. 2 is a conceptual view showing a cross-section of the glass laminate shown in FIG. 1.

FIG. 2 is a conceptual view showing a cross-section of the glass laminate 100 shown in FIG. 1.

Referring to FIG. 2, the glass laminate 100 includes the carrier glass substrate 10, the intermediate layer 20, and the thin glass substrate 30, which are adhered to each other in that order.

The intermediate layer 20 may include crystals 22 having columnar grain structures. As shown in FIG. 2, the crystals 22 have an oval shape and are perpendicular to the carrier glass substrate 10. However, the crystals 22 may be formed to have other shapes such as hexagonal pillar shapes, square pillar shapes, or cylindrical shapes. The shape of the crystals 22 is not limited thereto, provided that the crystals 22 may have columnar grain structures and may grow in a direction perpendicular to the plane of the substrates 10, 30. As shown in FIG. 2, the crystals 22 may have greater length in a direction perpendicular to the carrier glass substrate 10.

Figure 3A:
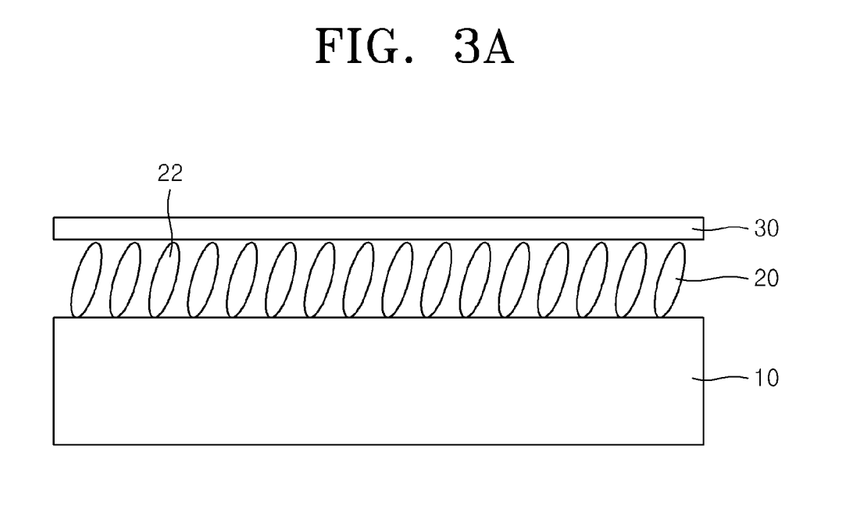
FIG. 3A and FIG. 3B are cross-sectional views of a glass laminate showing how relative locations of a carrier glass substrate and a thin glass substrate vary with respect to each other due to a thermal expansion coefficient difference between the carrier glass substrate and the thin glass substrate.
Figure 3B:
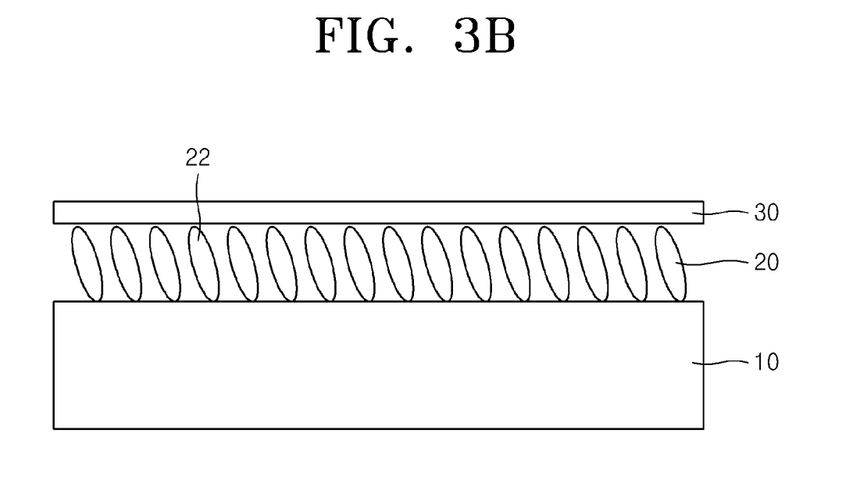

FIGS. 3A and 3B are cross-sectional views of the glass laminate 100 showing that the relative positions of the carrier glass substrate 10 and the thin glass substrate may change due to a difference between the thermal expansion coefficients of the carrier glass substrate 10 and the thin glass substrate 30.

In more detail, assuming that the carrier glass substrate 10 expands more than the thin glass substrate 30, FIG. 3A shows a left portion of the glass laminate 100 shown in FIG. 1, and FIG. 3B shows a right portion of the glass laminate 100 shown in FIG. 1. Under the opposite assumption that the thin glass substrate 30 expands more than the carrier glass substrate 10, FIG. 3A shows a right portion of the glass laminate 100 shown in FIG. 1, and FIG. 3B shows a left portion of the glass laminate 100 shown in FIG. 1.

As shown in FIGS. 3A and 3B, since the crystals 22 have columnar grain structures, the crystals 22 may be inclined to the left or right direction according to the relative positions of the carrier glass substrate 10 and the thin glass substrate 30. Therefore, the intermediate layer 20 may absorb the stress generated by the difference between the thermal expansion coefficients of the carrier glass substrate 10 and the thin glass substrate 30. Therefore, generation of cracks in the thin glass substrate 30 that is relatively weaker than the carrier glass substrate 10 may be prevented.

That is, when the carrier glass substrate 10 and the thin glass substrate 30 expand or contract at different rates, the crystals 22 located between the carrier glass substrate 10 and the thin glass substrate 30 and having the columnar structures may move in a back-and-forth direction. Thus, each of the carrier glass substrate 10 and the thin glass substrate 30 may expand or contract irrespective of the motion of the other glass substrate. Therefore, the generation of stress resulting from the difference between the thermal expansion coefficients may be prevented or reduced.

In order to make the crystals 22 having the columnar structure move as much as possible, the crystals 22 having the columnar structures may be softened or melted at a high temperature, for example, a temperature of about 350° C. or higher. When the crystals 22 having the columnar structures are softened, the crystals 22 may become viscous, and the intermediate layer 20 may fix the carrier glass substrate 10 and the thin glass substrate 30 with respect to each other. When the crystals are cooled down, the crystals 22 may harden, and in this case, the carrier glass substrate 20 and the thin glass substrate 30 may be easily separated from each other.

Figure 4:
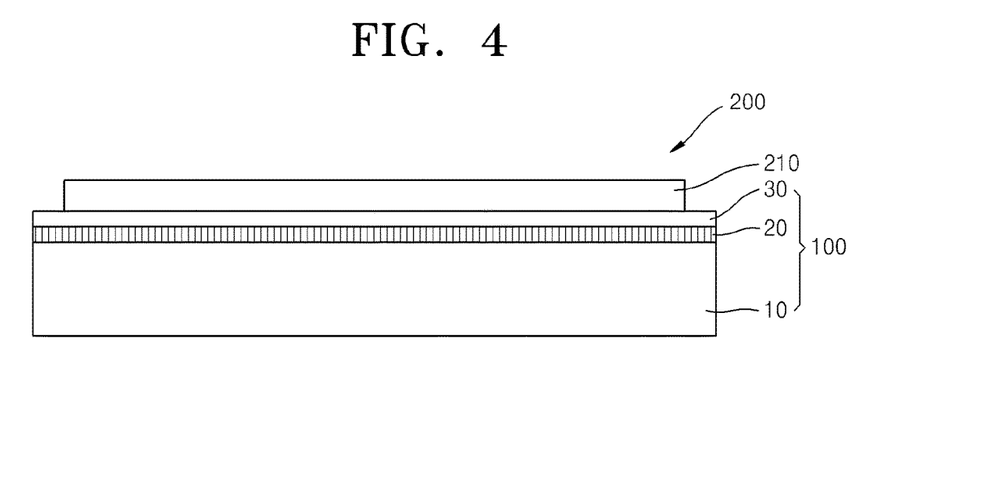
FIG. 4 is a cross-sectional view of a display element according to an exemplary embodiment of the present invention.

FIG. 4 is a cross-sectional view of a display element 200 on the carrier glass substrate 10 according to an exemplary embodiment of the present invention.

Referring to FIG. 4, the display element 200 includes a glass laminate 100, a display device layer 210 on the glass laminate 100, and an encapsulation layer (not shown) on the display device layer 210. The glass laminate 100 includes a carrier glass substrate 10, an intermediate layer 20 disposed on the carrier glass substrate 10, and a thin glass substrate 30 disposed on the intermediate layer 20. The glass laminate 100 shown in FIG. 4 may be substantially the same as the glass laminate 100 shown in FIG. 1, and thus, detailed descriptions thereof are omitted.

The display device layer 210 may include a thin film transistor (TFT) array, an emission layer, a protective layer, a wiring layer, a semiconductor layer, a colour filter, liquid crystal, a transparent electrode, and/or various circuit patterns configuring a display device, such as a liquid crystal display (LCD) or an organic light emitting diode (OLED).

If the display element 200 is an OLED element for manufacturing an organic light emitting display apparatus, the display device layer 210 may include a TFT array and an emission layer formed on the thin glass substrate 30. The emission layer may be an organic emission layer, and a pixel electrode and an opposite electrode may be disposed on an upper portion and a lower portion of the organic emission layer. The pixel electrode or the opposite electrode may be connected to the TFT array. The display device layer 210 may include a driving circuit and wiring patterns for driving the TFT array and the emission layer.

A method of manufacturing the display element 200 may include a process of forming the glass laminate 100 and a process of forming the display device layer 210 on the thin glass substrate 30 of the glass laminate 100. The process of forming the glass laminate 100 may include processes of preparing the carrier glass substrate 10 and the thin glass substrate 30, forming the intermediate layer 20 on the carrier glass substrate 10, and stacking the thin glass substrate 30 on the intermediate layer 20.

In particular, when forming of the glass laminate 100, the carrier glass substrate 10 and the thin glass substrate 30 may be cleaned by deionized water. The carrier glass substrate 10 and the thin glass substrate 30 may be cleaned manually or by using an automatic cleaning apparatus.

After the cleaning, the carrier glass substrate 10 and the thin glass substrate 30 may be dried in a furnace at a temperature of about 50° C. Hereinafter, it will be assumed that the intermediate layer 20 contains boron oxide having a columnar grain structure.

When the carrier glass substrate 10 and the thin glass substrate 30 are dried, the carrier glass substrate 10 may be coated with boric acid solution. The boric acid saturated solution is prepared by dissolving the boric acid in the deionized water to be saturated, and then, the boric acid saturated solution may be applied to the carrier glass substrate 10 by using the spin coating method. The carrier glass substrate 10 coated with the boric acid solution may be loaded in the furnace and the temperature set to about 450° C., for about, for example, 1 hour. The boric acid solution applied onto the carrier glass substrate 10 is transformed in the furnace into the boron oxide in a melted phase.

After the thermal treatment, the carrier glass substrate 10 having the boron oxide of the melted phase is unloaded from the furnace and cooled. Then, the boron oxide of melted phase is transformed into the boron oxide having the columnar grain structure, thereby forming the intermediate layer 20 on the carrier glass substrate 10. After that, the thin glass substrate 30 is stacked on the intermediate layer 20.

The process of forming the display device layer 210 on the thin glass substrate 30 of the glass laminate 100 may include a thermal treatment at a high temperature, for example, a temperature ranging from about 350° C. to about 450° C.

The display device layer 210 is not limited to this configuration. For example, the display device layer 210 may include a TFT array and a pixel electrode, a hole injection layer (HIL), a hole transport layer (HTL), an organic emission layer, an electron transport layer (ETL), an electron injection layer (EIL), an opposite electrode, and a thin film encapsulation layer of the organic light emitting display apparatus, or may include a TFT array, a color filter, and a liquid crystal layer of an LCD apparatus.

For example, if an organic light emitting display apparatus is to be manufactured, the method of manufacturing the display element 200 may include processes of forming a TFT array on the thin glass substrate 30, forming a pixel electrode connected to the TFT array, forming an organic emission layer on the pixel electrode, forming an opposite electrode, and forming an encapsulation layer.

If a TFT-LCD display apparatus is to be manufactured, the method of manufacturing the display element 200 on the carrier glass substrate may include processes of forming a TFT array on the thin glass substrate 30, forming a color filter on another glass substrate, bonding the thin glass substrate 30 on which the TFT array is formed and the another glass substrate on which the color filter is formed, to each other, injecting liquid crystal, and sealing an injection hole.

Figure 5:
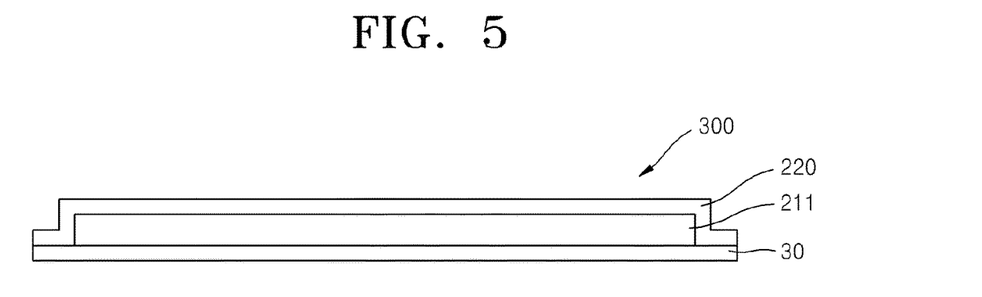
FIG. 5 is a cross-sectional view of a flexible display panel including a glass laminate according to an exemplary embodiment of the present invention.

FIG. 5 is a schematic cross-sectional view of a flexible display panel 300 manufactured by using a glass laminate according to an exemplary embodiment of the present invention. Referring to FIG. 5, the flexible display panel 300 may include a thin glass substrate 30, a display device layer 211, and a thin film encapsulation layer 220.

The thin glass substrate 30 is substantially the same as the thin glass substrate 30 of the glass laminate 100 shown in FIG. 1, and thus, descriptions thereof are omitted here. The display device layer 211 is substantially the same as the display device layer 210 of FIG. 3. Thus, only the thin film encapsulation layer 220 will be described below.

The display device layer 211 may be a display device layer of an organic light emitting display panel. The display device layer 211 and the thin film encapsulation layer 220 may correspond to the display device layer 210 of FIG. 3. The display device layer 211 may be covered by a flexible thin film encapsulation layer 220.

The organic emission layer in the display device layer 211 may be easily degraded by external moisture or oxygen. Therefore, in order to protect the display device layer 211, the display device layer 211 should be sealed, and the thin film encapsulation layer 220 may have a structure including a plurality of inorganic layers and a plurality of organic layers alternately stacked on each other in order to seal the display device layer 211. The thin film encapsulation layer 220 may have a structure including a plurality of inorganic layers and at least one organic layer alternately stacked. A lowermost layer or an uppermost layer of the film encapsulation layer 220 may be an organic layer.

The inorganic layers may be formed of aluminium oxide, silicon oxide, or silicon nitride, and each of the inorganic layers may include a stacked structure of a plurality of inorganic insulating layers. The inorganic layers may prevent external moisture and/or oxygen from infiltrating into the organic emission layer. The organic layer may be formed of an organic polymer. The organic layers may reduce internal stress of the inorganic layers, or supplement defects of the inorganic layers and planarize the inorganic layers.

After forming the display device layer 211 and the thin film encapsulation layer 220 on the thin glass substrate 30 of the glass laminate 100, the intermediate layer 20 of the glass laminate 100 may be hardened. After that, the carrier glass substrate 10 may be isolated from the thin glass substrate 30 on which the display device layer 211 and the thin film encapsulation layer 220 are formed. The intermediate layer 20 attached to the carrier glass substrate 10 may be completely isolated from the thin glass substrate 30. No remnants of the intermediate layer 20 may remain on the thin glass substrate 30.

The thin glass substrate 30 on which the display device layer 211 and the thin film encapsulation layer 220 are formed may form the flexible display panel 300.

Figure 6:
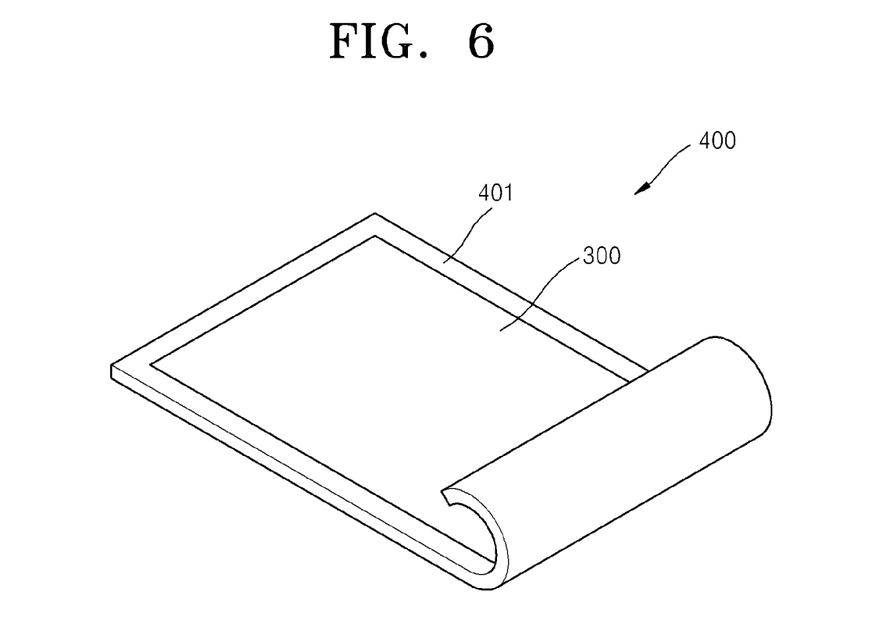
FIG. 6 is a perspective view of a flexible display device including a glass laminate according to an exemplary embodiment of the present invention.

FIG. 6 is a perspective view of a flexible display apparatus 400 manufactured by using a glass laminate according to exemplary embodiments of the present invention.

Referring to FIG. 6, the flexible display apparatus 400 may include a flexible display panel 300, which is substantially the same as the flexible display panel 300 shown in FIG. 5, and a housing 401.

The housing 401 may cover side surfaces and/or a rear surface of the flexible display panel 300 in order to protect the flexible display panel 300. The housing 401 may be formed of a flexible material, and as shown in FIG. 6, the flexible display apparatus 400 may be wound or curved.

According to the glass laminate and the method of manufacturing the glass laminate of the embodiments of the present invention, the intermediate layer is formed of a material having a columnar grain structure between the carrier glass substrate and the thin glass substrate. Thus, permanent bonding between the carrier glass substrate and the thin glass substrate may be prevented, and cracks caused by the difference between the thermal expansion coefficients of the carrier glass substrate and the thin glass substrate may also be prevented. The thin glass substrate may be isolated from the carrier glass substrate without being damaged. In addition, when the thin glass substrate is attached to the carrier glass substrate, the generation of bubbles between the carrier glass substrate and the thin glass substrate may be prevented. Since the display panel and the display apparatus include the thin glass substrate having high resistance against oxygen and moisture, the display apparatus has high durability while the flexible property thereof is maintained.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a glass laminate, the method comprising:
   forming an intermediate layer continuously on a first substrate; and
   disposing a second substrate on the intermediate layer, wherein the intermediate layer is formed of a material having a columnar grain structure.

2. The method of claim 1, wherein the forming of the intermediate layer comprises:
   applying a liquid phase material to the first substrate; and solidifying the liquid phase material to form the material having the columnar grain structure.

3. The method of claim 2, wherein the solidifying the liquid phase material comprises growing the columnar grain structure in a direction perpendicular to a plane of the first substrate.

4. The method of claim 2, wherein the applying of the liquid phase material on the first substrate comprises spin coating.

5. The method of claim 1, wherein the forming of the intermediate layer by using the material having the columnar grain structure comprises using a physical vapor deposition process or a chemical vapor deposition process.

6. The method of claim 1, wherein the stacking of the second substrate on the intermediate layer comprises:
   softening the material of the intermediate layer; and
   attaching the second substrate to the softened intermediate layer.

7. The method of claim 1, wherein the forming of the intermediate layer comprises:
   applying a boric acid solution comprising boric acid ($H_3BO_3$) to the first substrate;
   forming a metaboric acid ($HBO_2$) on the first substrate by heating the first substrate to a temperature of about 170° C.;
   forming a boron trioxide ($B_2O_3$) on the first substrate by heating the first substrate to a temperature of about 300° C. or greater;
   melting the boron trioxide by heating the first substrate at a temperature of about 450° C.; and
   cooling the carrier glass substrate to form a boron trioxide material having the columnar grain structure.

8. A method of manufacturing a display panel, the method comprising:
   manufacturing the glass laminate according to claim 1;
   forming a display device layer on the second substrate of the glass laminate; and
   forming an encapsulation layer on the display device layer.

9. The method of claim 8, further comprising removing the first substrate of the glass laminate.

10. The method of claim 9, wherein the removing of the first substrate of the glass laminate comprises:
    hardening the intermediate layer; and
    separating the second substrate on which the display device layer is formed from the hardened intermediate layer.

* * * * *